United States Patent
Kaplinsky

(10) Patent No.: US 7,548,258 B2
(45) Date of Patent: Jun. 16, 2009

(54) HIGH RESOLUTION NETWORK VIDEO CAMERA WITH MASSIVELY PARALLEL IMPLEMENTATION OF IMAGE PROCESSING, COMPRESSION AND NETWORK SERVER

(75) Inventor: Michael Kaplinsky, Sierra Madre, CA (US)

(73) Assignee: Arecont Vision LLC., Glendale, CA (US)

( * ) Notice: Subject to any disclaimer, the term of this patent is extended or adjusted under 35 U.S.C. 154(b) by 783 days.

(21) Appl. No.: 10/994,747

(22) Filed: Nov. 22, 2004

(65) Prior Publication Data

US 2005/0140787 A1 Jun. 30, 2005

Related U.S. Application Data

(60) Provisional application No. 60/524,490, filed on Nov. 21, 2003, provisional application No. 60/524,449, filed on Nov. 21, 2003, provisional application No. 60/524,448, filed on Nov. 21, 2003, provisional application No. 60/524,488, filed on Nov. 21, 2003.

(51) Int. Cl.
    *H04N 5/232* (2006.01)
(52) U.S. Cl. .................................. 348/211.99; 725/105
(58) Field of Classification Search .............. 348/222.1, 348/211.99; 725/105
    See application file for complete search history.

(56) References Cited

U.S. PATENT DOCUMENTS

| 5,138,459 | A | * | 8/1992 | Roberts et al. | 348/231.6 |
| 6,961,083 | B2 | * | 11/2005 | Obrador et al. | 348/220.1 |
| 6,992,707 | B2 | * | 1/2006 | Obrador | 348/220.1 |

* cited by examiner

*Primary Examiner*—Tuan V Ho
(74) *Attorney, Agent, or Firm*—Christie, Parker & Hale, LLP.

(57) ABSTRACT

The subject of the present invention is the network video camera capable of delivering high-resolution digital images, comprising over a million of pixels per image, at full motion video frame rate. The camera disclosed in the present invention comprises high resolution image sensor capable of operating at video frame rate, computer network interface for transmission off camera of image data streams originated by said image sensor, and also comprising multi stage pipelined digital image processor operating under control of low cost microprocessor capable of processing and compression of image data at the output rate of said image sensor, wherein said image processor comprises image processing pipeline formed by multiple distinct stages, wherein most of said stages perform distinctly different image processing operations and wherein each said stage has an output latch or buffer and accepts its input data from the output latch or buffer of one or more of other said stages, wherein image data propagates from stage to stage and wherein each of said stages performs its operations on image data concurrently and synchronously with most of other said stages performing their respective operations.

28 Claims, 3 Drawing Sheets

Block-Diagram of High Resolution Network Camera with Massively Parallel Image Processing Compression and Network Interface

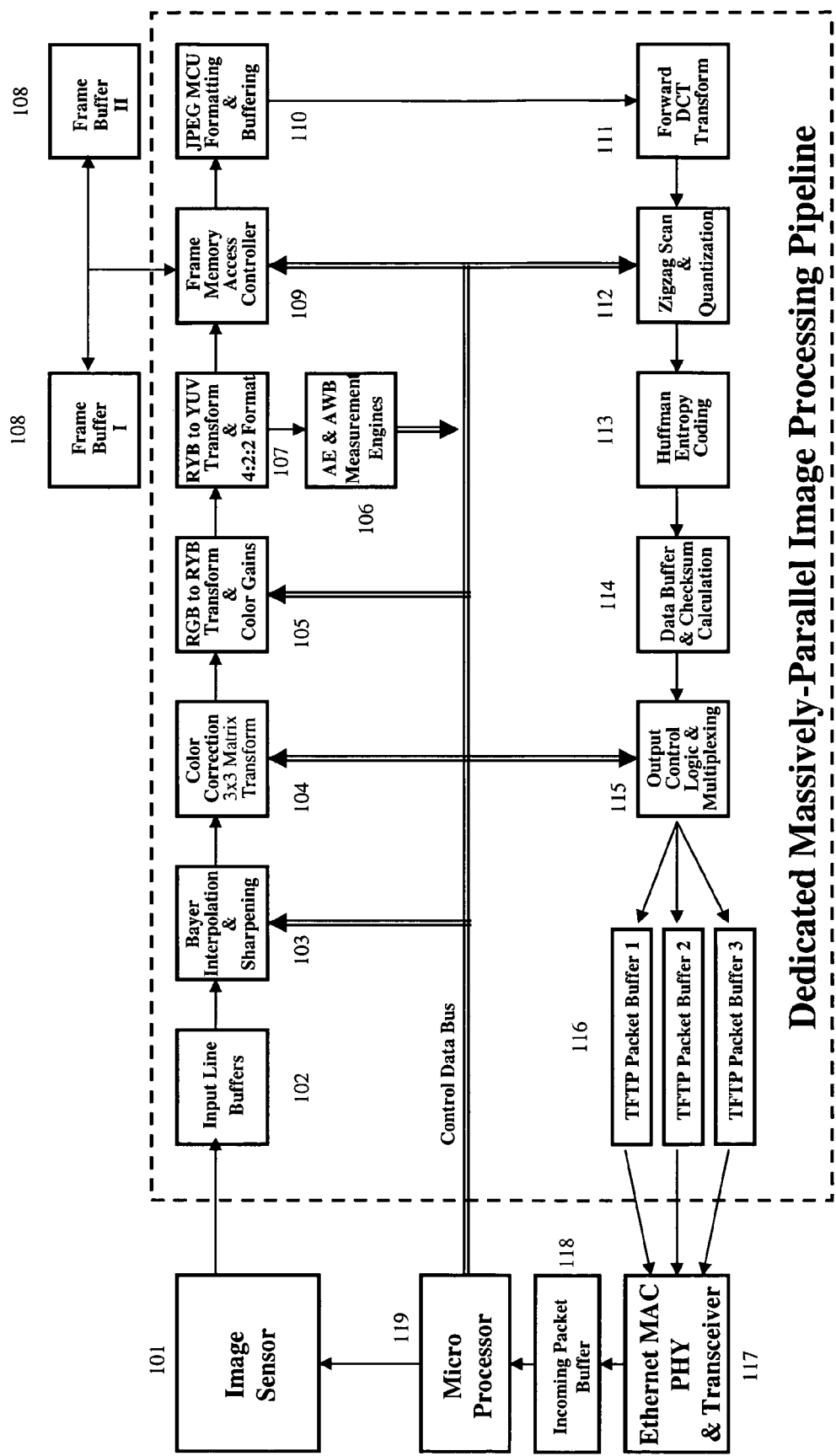
Figure 1. Block-Diagram of High Resolution Network Camera with Massively Parallel Image Processing Compression and Network Interface

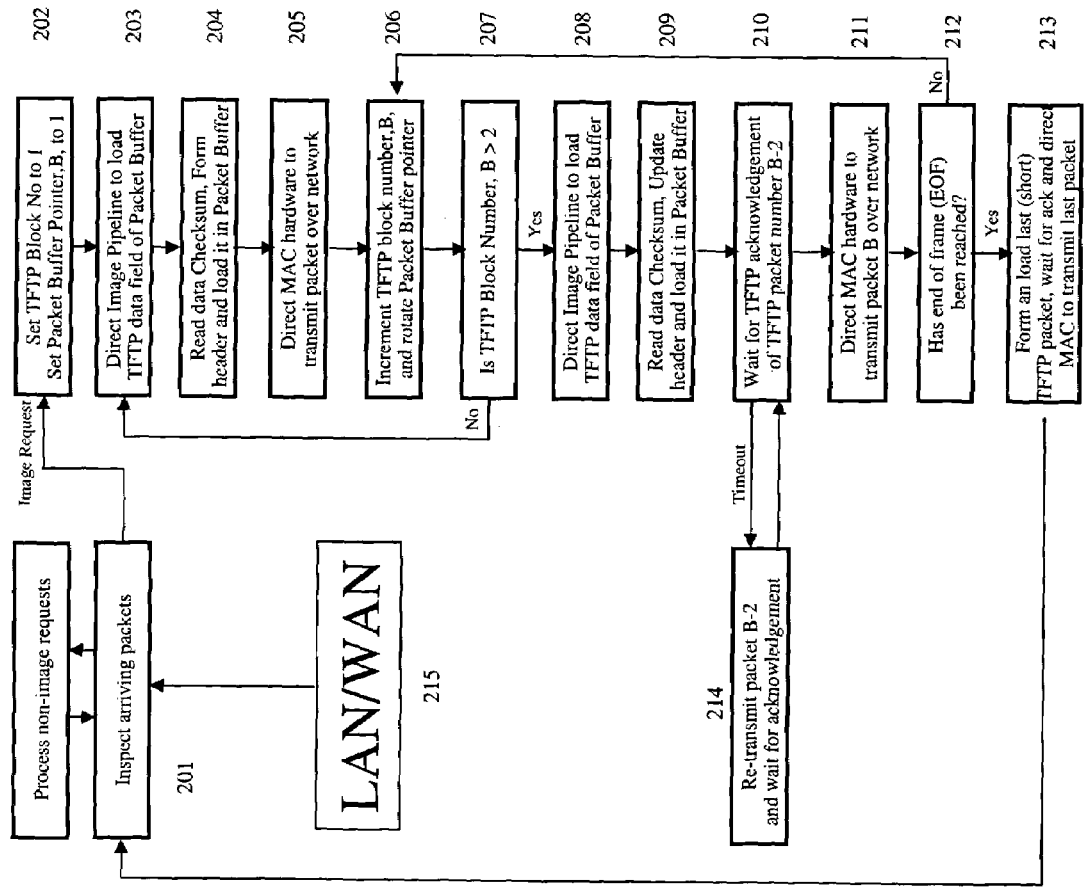
Figure 2. Flow-Chart of High-Bandwidth Camera Network Interface Based on Modified TFTP

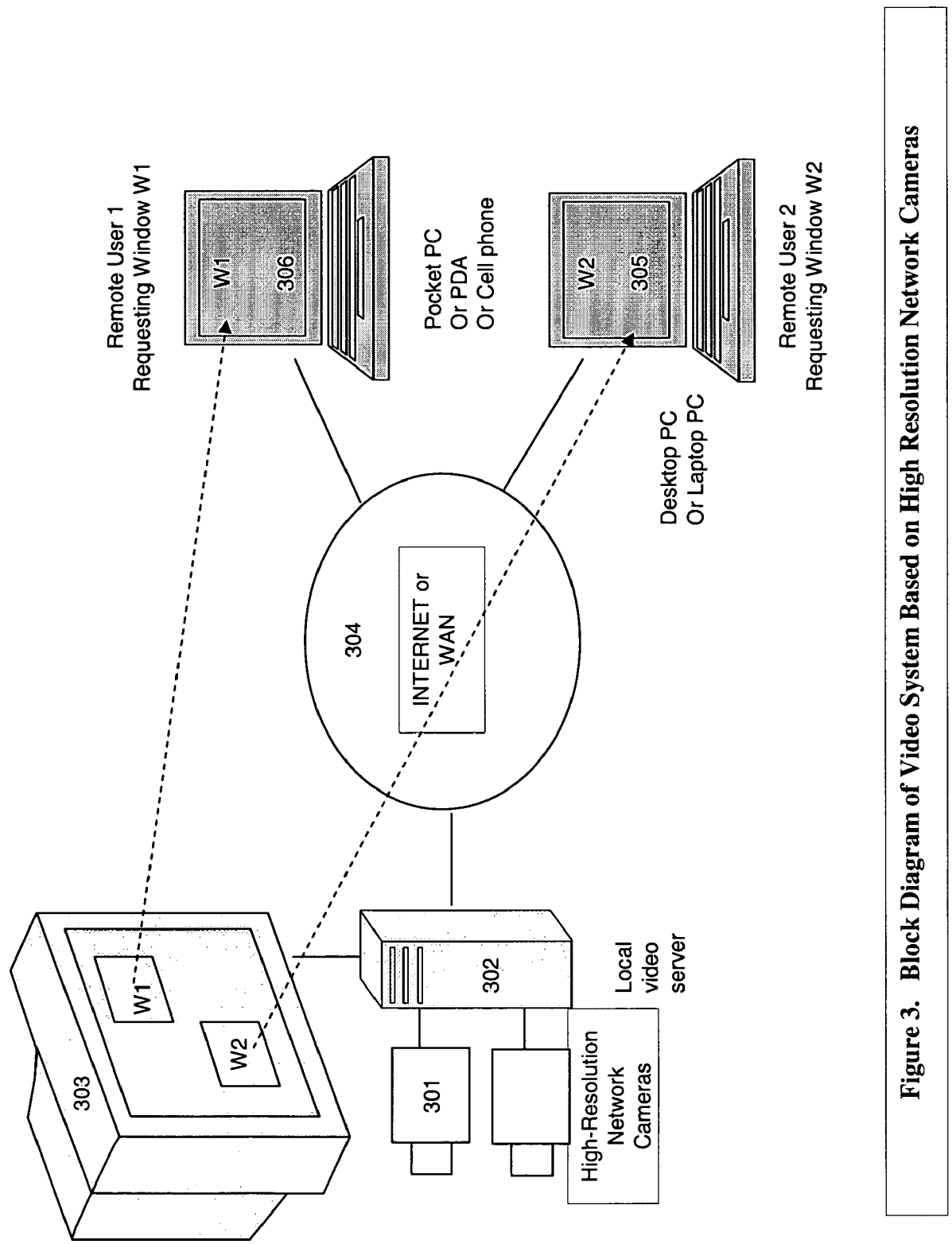
Figure 3. Block Diagram of Video System Based on High Resolution Network Cameras

HIGH RESOLUTION NETWORK VIDEO CAMERA WITH MASSIVELY PARALLEL IMPLEMENTATION OF IMAGE PROCESSING, COMPRESSION AND NETWORK SERVER

CROSS REFERENCE TO RELATED APPLICATIONS

This application claims the benefit of U.S. Provisional Application Nos. 60/524,490 filed Nov. 21, 2003, 60/524,449 filed Nov. 21, 2003, 60/524,448 filed Nov. 21, 2003, and 60/524,488 filed Nov. 21, 2003, the contents of which are incorporated by reference herein.

Also incorporated by reference herein are the following applications which were filed on Jul. 14, 2004: Ser. Nos. 10/890,870, 10/890,911, 10/890,912, 10/890,913, 10/890,914 and 10/890,915.

Also incorporated by reference herein are the following applications filed on even date herewith:

| Title | Attorney Docket | Priority Application |
|---|---|---|
| VIDEO SURVEILLANCE SYSTEM BASED ON HIGH RESOLUTION NETWORK CAMERAS CAPABLE OF CONCURRENT TRANSMISSION OF MULTIPLE IMAGE FORMATS AT VIDEO RATES | A832:53964 | 60/524,448 |
| METHOD FOR ACCURATE REAL-TIME COMPENSATION FOR CHANGING ILLUMINATION SPECTRA IN DIGITAL VIDEO CAMERAS | A832:53965 | 60/524,488 |

BACKGROUND OF THE INVENTION

Most currently installed video surveillance and monitoring systems are based on NTSC/PAL/SECAM analog video cameras, with camera resolution rigidly fixed by the corresponding video standard. Thus, to inspect fine detail of the scene, NTSC surveillance systems have to rely on expensive optical zoom and mechanical pan and tilt. However, higher optical zoom inevitably corresponds to reduced field of view of the camera, requiring the operator to make a choice between higher level of detail and higher coverage of the area under surveillance. Furthermore, the actuators responsible for mechanical pan, tilt and zoom are typically slow as compared with the camera frame-rate. This makes zooming on rapidly moving targets, such as license plates of the moving automobile, difficult if not impossible.

In contrast to NTSC-based video, network cameras are not restricted to the specific resolution and frame rate and are primarily limited by the on-camera computational resources and available network bandwidth. Network video cameras rely on packet-oriented digital image transmission are not limited to any particular image resolution and frame rate. This opens the door for the development of high-resolution video surveillance systems that are overall superior to existing NTSC systems and provide video-rate multi-format functionality and instantaneous pan, tilt and zoom capability, previously unavailable in video surveillance.

However, to produce multi-megapixel imagery at video rates, the network camera has to be able to perform image processing, compression and network transmission at vastly higher data bandwidths than are typical for NTSC cameras. Conventional approach of implementing image processing, compression and network protocols in general purpose DSPs and microprocessors significantly limits overall camera bandwidth necessitating the trade-offs between camera frame-rate and resolution.

SUMMARY OF THE INVENTION

The subject of this invention is the network video camera capable of delivering high-resolution images, comprising over a million of pixels per image, at video rate. The camera disclosed in the present invention comprises high resolution image sensor capable of operating at video frame rates, image processor, image buffer memory and network interface for transmission of the images off camera. In its preferred embodiment the camera disclosed in the present invention comprises ASIC or one or more Field Programmable Gate Array (FPGA) operating under control of low cost microprocessor, where said ASIC or FPGAs implement massively parallel image processing pipeline executing time-critical operations on image pixels, where the flow of image pixels is operated on by the sequential stages of the pipeline with each pipeline stage operating in parallel with all or many of the other pipeline stages, while said microprocessor controls the operation of the image processing pipeline, performs image pipeline and network initialization operations, relatively slow operations associated with automatic exposure and gain control, white balance and protocol-level network interface computations as well as maintains the register space constituting the user interface to the camera.

In its preferred embodiment the present invention includes computer on the on the receiving end of the network interface and connected to said computer monitor, wherein said computer is configured to run image processing and acquisition software configured to acquire the images from one or more of the disclosed in the present invention cameras, decompress and display the images on the monitor, store the images into digital archives and respond to the requests of remote users by sending to them complete or partial images acquired from the camera.

BRIEF DESCRIPTION OF DRAWINGS

FIG. 1 depicts block-diagram of high resolution network camera with massively parallel Image processing, compression and network interface.

FIG. 2 depicts flow-chart of high-bandwidth camera network interface based on modified TFTP protocol.

FIG. 3 depicts block-diagram of video system based on high resolution network cameras.

DETAILED DESCRIPTION OF THE INVENTION

The subject of the present invention is the network video camera capable of delivering high-resolution digital images, comprising over a million of pixels per image, at full motion video frame rate. The camera disclosed in the present invention comprises high resolution image sensor capable of operating at video frame rate, computer network interface for transmission off camera of image data streams originated by said image sensor, and also comprising multi stage pipelined digital image processor operating under control of low cost microprocessor capable of processing and compression of image data at the output rate of said image sensor, wherein said image processor comprises image processing pipeline formed by multiple distinct stages, wherein most of said stages perform distinctly different image processing operations and wherein each said stage has an output latch or buffer and accepts its input data from the output latch or buffer of one or more of other said stages, wherein image data propagates from stage to stage and wherein each of said stages performs its operations on image data concurrently and synchronously with most of other said stages performing their respective operations. FIG. 1 depicts block-diagram of high resolution network camera with massively parallel Image processing, compression and network interface.

In its preferred embodiment the camera disclosed in the present invention comprises one or more ASIC or Field Programmable Gate Array (FPGA) operating under the control of microprocessor, where said ASICs or FPGAs are configured to implement massively parallel image processing pipeline executing time-critical operations on image pixels at the rate equal to the pixel output rate of said image sensor, where said image pixels are operated upon by the sequential stages of said image processing pipeline with each pipeline stage operating in parallel with all or many of the other stages of said pipeline, while said microprocessor controls the operation of the image processing pipeline, performs image pipeline, network interface and other initialization operations, relatively slow operations associated with automatic exposure and gain control, white balance and protocol-level network interface computations as well as maintains the register space constituting the user interface to the camera.

In the preferred embodiment of the present invention, said massively-parallel image processing pipeline comprises interpolation of one-color-per-pixel pixel array into 3 color-per-pixel image stream, color correction, representing multiplication of the RGB pixel components by 3×3 color correction matrix, aperture correction, representing the application of 2-dimensional sharpening filter to the image, RGB to YUV transformation resulting in an image representation suitable for JPEG or other image compression, gamma correction, representing exponential image transformation, as well as Auto Exposure and Gain Adjustment (AE) and Auto White Balance (AWB) measurement engines that collect image brightness and color statistics required for the AE and AWB algorithms, buffering of processed image streams into one or more image frame buffers, image buffer memory access controller, pipelined image compression module, one or more network packet memory buffers and the output control logic providing an interface between said image compression module and said network packet buffers.

In another embodiment of the present invention, image-processing pipeline implements additional operations, including 2-dimensional pixel defect correction, compensation for image distortions introduced by the optics, color saturation control and histogram equalization of the image.

In one of the embodiments of the present invention said pixel defect correction is performed by substitution of the defective pixels with one of the pixels from the pixels immediately surrounding said defective pixel. In the later embodiment, for all image pixels, the luminance value of the pixel currently being processed (current pixel) is compared to the luminance values of 8 immediately surrounding it pixels of the same color (surrounding pixels), wherein said substitution is performed if the current pixel has a luminance value either above or below the luminance values of all said surrounding pixels and wherein said substitution is performed by the replacement of all color components of said current pixel with the corresponding color components of the replacement pixel, wherein said replacement pixel is one of the surrounding pixels and wherein said replacement pixel has a luminance value least different from said current pixel.

In the preferred embodiment of the present invention, once the frame has ended and AE and AWB measurement engines accumulated brightness and color statistics of the image (where the preferred criteria for said measurements is separately disclosed by the author), the microprocessor interfaced to the image processing pipeline performs AWB calculation to determine new color channel gains and color correction matrix as well as AE calculations to determine new gain settings of the pre-adc amplifiers as well as new value of the optical integration time. Once these values are obtained, they are loaded in the image sensor and color pipeline registers to be applied to the image on the subsequent frame.

In the preferred embodiment of the present invention, two full frame memory buffers are used between image processing (to YUV) and image compression, wherein processed but uncompressed images are stored in said memory buffers. The memory buffers are accessed so that one buffer is being filled with new uncompressed data while the other buffer is read out into first stage of image compression module. This arrangement essentially allows the speed image readout from the camera to be independent of the image sensor pixel output and frame rates.

In another embodiment of the present invention, two full frame memory buffers are used at the beginning of the image processing pipeline, wherein unprocessed image sensor output is stored in said buffers, wherein only one color component per pixel is stored, resulting in the reduced requirement to the size of the image buffer memory. In this later embodiment repeated readout of the same image or image segment from the image buffer memory requires repeated processing of said image through the entire image processing pipeline.

In yet another embodiment of the present invention the required size of the image buffer memory is further reduced by placing said memory at the end of image compression module. In this later embodiment camera does not support concurrent output of multiple image windows originating from the same image frame.

In one of the embodiments of the present invention at least three full frame image memory buffers are used, wherein the new image is stored in one memory buffer, and two previously processed images are stored in two other memory buffers, wherein both image buffers containing processed image are available for the readout of the images into the output stages of the image processing pipeline and wherein the buffer containing the image frame that has already been output from the camera is made available for storage of the new image frame. In this later embodiment the maximum possible camera frame rate may be realized as the access to the input and output image frame buffers does not need to be synchronized.

In the preferred embodiment of the present invention the camera is capable of outputting multiple image formats, including full resolution images, image sub-windows representing rectangular regions of the entire image as well as reduced resolution decimated images. This is accomplished by reading specified areas of the image frame memory buffer. In the preferred embodiment of the present invention one of the modes of camera operation supports concurrent output of multiple image formats. In the preferred embodiment said concurrent output includes output of full field of view decimated image concurrently with the output of full resolution sub-window of the image, providing for a concurrent availability of zoomed and panoramic video streams. Video streams of different image formats are output by means of time interleaving, wherein said interleaving is performed either on a frame-by-frame basis or on packet-by-packet basis. In the preferred embodiment, the frame-by-frame interleaving is achieved by reading data from the image memory buffer two or more times during one frame time of the imager, outputting from camera different image formats one after another.

In the preferred embodiment of the present invention, pipelined implementation of JPEG compression includes stages that perform MCU formation, Forward Discrete Cosine Transform (FDCT), zigzag scan, quantization and entropy coding. In the preferred embodiment of the present invention 2-dimensional FDCT is implemented as two passes through 1-Dimensional FDCT transform, utilizing the fact that FDCT is a separable transformation.

In yet another embodiment of the present invention, other image compression methods, such as JPEG2000 or MPEG-2 are substituted for baseline JPEG implementation.

In the preferred embodiment the operation of the image compression segment of the image processing pipeline is controlled by the output control logic and on-camera microprocessor, wherein the uncompressed image is read from the image buffer memory and processed by the image compression stages of the pipeline at the rate required to fill available network packet buffers, wherein microprocessor directs image buffer memory and compression engine to read and compress just enough image data for the next network packet being formed, and wherein microprocessor disables image buffer memory and image compression pipeline in the absence of external image requests as well as in the absence of empty network packet buffers.

In the preferred embodiment of the present invention a modified version of Trivial File Transfer Protocol (TFTP—as described in RFC783) is implemented as the primary mode of image transmission, where TFTP protocol headers are formed and recorded in the transmit packet buffers by the microprocessor, data fields of the TFTP packets, i.e. image data, along with the corresponding checksums are formed by the output control logic of the image processing pipeline. FIG. 2 depicts flow-chart of high-bandwidth camera network interface based on modified TFTP protocol.

In the preferred embodiment of the present invention, output stages of image processing pipeline comprise three or more network packet buffers, wherein one buffer is available for storage of the compressed data incoming from the image compression module, another packet buffer contains the packet currently being transmitted to the Media Access Control (MAC) Ethernet interface, and wherein one or more packet buffers contain packets to be transmitted next. This multi-buffer scheme guarantees that during the transmission of the image frame there is always a packet available for transmission, wherein utilization of available network bandwidth is maximized and the transmitted packet remains available for the re-transmission in the event of network errors.

In the preferred embodiment of the present invention, camera comprises microprocessor interfaced with the image processing pipeline and Ethernet MAC and PHY hardware and configured to support a number of network protocols. In the preferred embodiment, to reduce overall complexity of implementation, a minimal set of protocols consisting of UDP, TFTP, ARP, IP, and ICMP protocols is supported. In another embodiment of the present invention TCP/IP and DHCP protocols are also supported.

In the preferred embodiment of the present invention microprocessor is configured to interpret incoming data packets, to assemble the responses to certain requests (e.g. register access, ARP, ICMP, etc) and to coordinate the loading and readout of said network packet buffers of said image pipeline. In the preferred embodiment of the present invention the microprocessor is a low-cost microprocessor with substantially lower data processing throughput than the throughput of the image processing pipeline.

In the preferred embodiment of the invention, the microprocessor is configured to receive and process the requests for image transmission, wherein microprocessor periodically pools network interface hardware for the availability of newly arrived packets or, alternatively, microprocessor is interrupted by the MAC hardware once the new packet arrives over the network interface. In the preferred embodiment of the invention, the nature of the arriving request is determined by the "filename" field of TFTP request, wherein said filename identifies whether the request pertains to the image or register operation, as well as other request parameters including image size, resolution, compression quality and whether the request is for the new image or for the different portion of the previously transmitted image.

In the preferred embodiment of the present invention, if said arriving network packet is determined to contain the request for the image transmission, microprocessor responds to auto-negotiation parameters, if any, and then reads the checksum of the next packet as generated by the checksum module of the image processing pipeline, generates the header of the TFTP packet and loads it in the currently available transmit packet buffer, directs the image processing pipeline to fill the rest of said buffer with the compressed image data and then issues the transmit command to the MAC hardware.

Immediately after the first image packet has been assembled, microprocessor checks image buffer access control logic for the end of frame (EOF) flag and, if it is absent, reads the checksum and forms the header of the next packet, directs image-processing pipeline to load said packet in the transmit buffer, issues transmit command to the MAC hardware and then immediately repeats the same operations for one or more packets.

It is therefore one of the subjects of the present invention that the camera is configured to implement modified TFTP protocol, wherein the differences with the applicable standard relate to the treatment of packet acknowledgements and packet re-transmission in the event of network errors. Said modifications of the TFTP protocol are designed to facilitate high throughput image delivery across the network, wherein the effects of roundtrip packet delay on the network interface throughput are reduced or eliminated.

In the preferred embodiment of the present invention once the first image packet has been transmitted, microprocessor forms and directs MAC hardware to transmit the one or more packets without waiting for the arrival of the acknowledgements.

In the preferred embodiment, camera microprocessor is configured to transmit two or more initial image packets without waiting for the acknowledgement packets and then to start waiting for the arrival of acknowledgement of the first transmitted video packet. In this embodiment, if any transmitted packet remains unacknowledged until an expiration of the timeout period, said microprocessor is configured to issue packet retransmission command to the MAC hardware to retransmit the unacknowledged packet. In the absence of the timeout, microprocessor is configure to direct MAC hardware to send the next buffered packet immediately upon receipt of acknowledgement and to direct image processing pipeline to fill the packet buffer containing the acknowledged packet with the new image data.

In the preferred embodiment of the present invention, once initial image packets have been transmitted and all transmit buffers contain packet headers of previously transmitted packets, microprocessor is configured to form new packets by updating only those packet header fields that are different from the previous packet, wherein most of the information in the IP, UDP and TFTP headers remains unchanged (source and destination IP and MAC addresses, UDP ports, IP header checksum, etc.). In this embodiment the fields of said image packet headers that change from one packet to the next include UDP checksum (that includes new data checksum) and TFTP block number.

The modified TFTP protocol of the preferred embodiment drastically increases camera network interface throughput by reducing or eliminating the acknowledgement wait times as the packets are sent ahead of the arrival of expected acknowledgements. While this is different from FTP RFC783 protocol description, the compatibility with the compliant TFTP clients is preserved as long as the transmitted packets do not arrive out of order. Within local area networks, given large (up to 1522 bytes) TFTP packets employed by the camera, the arrival of packets out of order is highly unlikely. However, in the preferred embodiment of the present invention the TFTP client on the receiving end of the network interface is configured to sort the arriving from the camera packets so as to guarantee the ascending order of TFTP block numbers.

In the preferred embodiment of the present invention camera microprocessor is configured to monitor end of frame (EOF) flag set by image buffer access logic. Microprocessor is configured to load an EOF packet in the next available packet buffer once EOF flag has been set. In the preferred embodiment of the present invention, said EOF packet is shorter than other image data packets and contains either no data or camera status indicator in the TFTP data field, wherein reduced packet size signifies the last packet in the image transmission. Once the last image packet has been acknowledged by the receive, microprocessor prepares for the new request by resetting network connection and initialization of TFTP block number counter and UDP source and destination ports.

In the preferred embodiment the register writes and reads are also accomplished via TFTP protocol, where register numbers and values are embedded in the data field of register access requests, where particular type of the request is identified by the TFTP "filename" field. In another embodiment of the present invention, TCP/IP protocol is used for register and image access.

In its preferred embodiment the present invention includes computer on the on the receiving end of the network interface and connected to the computer monitor, wherein said computer is configured to perform the functions of local video server and to run image processing and acquisition software configured to acquire the images from one or more of the disclosed in the present invention cameras, decompress and display the images on the monitor, store the images into digital archives and respond to the requests of remote users by sending to them complete or partial images acquired from the camera. FIG. 3 depicts block-diagram of video system based on high resolution network cameras.

What is claimed as new and desired to be protected by Letters of Patent of the United States is:

1. A network comprising:
   a high resolution image sensor;
   a computer network interface for transmission off camera of image data streams originated by said image sensor;
   a multi stage pipelined digital image processor capable of processing and compression of said image data at an output rate of said image sensor, wherein said image processor comprises an image processing pipeline formed by multiple distinct stages, wherein most of said stages perform distinctly different image processing operations, wherein each said stage has an output latch or a buffer to accent input data from the output latch or the buffer of one or more of other said stages, wherein said image data propagates from one stage to another stage, and wherein each of said stages performs a respective operation on said image data concurrently and synchronously with most of other said stages performing their respective operations; and
   a microprocessor or a CPU configured to initialize the pipeline, communicate with a pipeline measurements engine, set pipeline registers to control dataflow through pipeline multiplexers, and set pipeline parameters utilized in automatic white balance and automatic exposure and gain control operations.

2. The network camera of claim 1, wherein said microprocessor is further configured to perform processing of statistics accumulated by said measurement engines of the image processing pipeline, calculations of exposure time and gain settings, and calculation of auto white balance parameters.

3. The network camera of claim 1, wherein said microprocessor is configured to support network communication with external to the camera clients and wherein said microprocessor is configured to communicate with camera MAC hardware, to interpret incoming network packets and to form network packet headers wherein said microprocessor relies on the output logic of the image processing pipeline for the computation of partial packet checksums and for loading of the image data in the data fields of the outgoing network packets.

4. The network camera of claim 1, wherein said image processing pipeline comprises stages configured to perform color interpolation, image sharpening, color separation, gamma correction and color space conversion, wherein said color interpolation comprises converting one-color-per-pixel image into three-colors-per-pixel image, wherein said color interpolation comprises performing multiplication of red, green and blue pixel components by a 3x3 color correction matrix, and wherein said image sharpening comprises applying a 2-dimensional high-pass filter to the image, and wherein said color space conversion comprises converting color components of the image to a YUV, YCrCb color-difference representation suitable as an input to the image compression stages of said image processing pipeline.

5. A network comprising:
   a high resolution image sensor;
   a computer network interface for transmission off camera of image data streams originated by said image sensor;
   a multi stage pipelined digital image processor capable of processing and compression of said image data at an output rate of said image sensor, wherein said image processor comprises an image processing pipeline formed by multiple distinct stages, wherein most of said stages perform distinctly different image processing operations, wherein each said stage has an output latch or a buffer to accent input data from the output latch or the buffer of one or more of other said stages, wherein said image data propagates from one stage to another stage, and wherein each of said stages performs a respective operation on said image data concurrently and synchronously with most of other said stases performing their respective operations; and
   a microprocessor or a CPU, wherein said image processing pipeline comprises measurement engines configured to accumulate image brightness and color statistics, and wherein said measurement engines include means for communicating said statistics to said microprocessor or CPU.

6. The network camera of claim 5, wherein said image processing pipeline further comprises stages configured to perform a 2-dimensional pixel defect correction, compensation for image distortions introduced by optics, color saturation control, and histogram equalization of the image.

7. The network camera of claim 6, wherein said 2-dimensional pixel defect correction is performed by substituting a defective pixel with one of the non-defective pixels immediately surrounding said defective pixel.

8. The network camera of claim 7, wherein, for all image pixels, a luminance value of a pixel currently being processed as a current pixel is compared to luminance values of 8 pixels of the same color immediately surrounding said current pixel wherein said substitution of the defective pixel is performed if the current pixel has a luminance value either above or below the luminance values of all said 8 surrounding pixels, wherein said substitution is performed by replacement of all color components of said current pixel with corresponding color components of the replacement pixel, wherein said replacement pixel is one of the 8 surrounding pixels, and wherein said replacement pixel has a luminance value least different in magnitude from the luminance value of said current pixel.

9. The network camera of claim 5, wherein said image processing pipeline further comprises stages configured to perform image compression.

10. The network camera of claim 9, wherein said image compression is a baseline JPEG compression, and wherein said image processing pipeline comprises stages configured to perform formation of minimally coded units, forward discrete cosine transform, zigzag scan, and quantization and entropy coding.

11. The network camera of claim 9, wherein said image compression is a JPEG2000 or a MPEG-2 compression.

12. A network video camera comprising:
a high resolution image sensor;
a computer network interface for transmission off camera of image data streams originated by said image sensor;
a multi stage pipelined digital image processor capable of processing and compression of image data at an output rate of said image sensor, wherein said image processor comprises an image processing pipeline formed by multiple distinct stages, wherein most of said stages perform distinctly different image processing operations, wherein each said stage has an output latch or a buffer to accept input data from the output latch or the buffer of one or more of other said stages, wherein said image data propagates from one stage to another stage, wherein each of said stages performs a respective operation on said image data concurrently and synchronously with most of other said stages performing their respective operations, and wherein said network video camera is capable of concurrent output of image sequences of different sizes and resolutions; and
one or more image memory buffers and an image memory buffer access controller, wherein said access controller is configured to store images in the image memory buffer and to read stored images from the image memory buffer, and to reduce resolution and size of said images by performing image decimation and image windowing.

13. The network camera of claim 12, further comprising at least two image memory buffers, wherein said memory buffer access controller is configured to store incoming image frames from said sensor in one of said image memory buffers and to read image frames or partial image frames from another of said image memory buffers, wherein said images are stored in said image memory buffer at a rate not less than the output rate of said image sensor, wherein the images are read from said another image memory buffer at a rate determined by an output bandwidth of said network interface, wherein said memory access controller is configured to access said image memory buffers so that once an image readout from one image memory buffer, said one image memory buffer is then used for storage of next incoming image frame and while the image memory buffer that was previously used for storing the image frame is used for readout of a next image frame to be output from said sensor.

14. The network camera of claim 12, further comprising at least three image memory buffers, wherein one of said image memory buffers is available for storage of the incoming image frame, another of said image memory buffers is available for the readout of the image frame to be output from said sensor, and a third image memory buffer holds a next image frame to be output from said sensor, wherein once an image memory buffer has been readout, the image memory buffer is made available for storage of a new incoming image frame.

15. The network camera of claim 12, wherein said image memory buffer access controller is configured to support concurrent output of multiple image formats, to form output image frames by reading the same image stored in an image memory buffer two or more times, and to create different output frame formats by reading different segments of the stored image, wherein said image frames of different formats are output from the camera one after another.

16. The network video camera of claim 15, wherein said memory access controller is configured to read and decimate an entire image frame stored in said image memory buffer and wherein said access controller subsequently read a specified rectangular region of the same image, and to cause the camera output format to continuously switch on a frame-by-frame basis between a full field of view reduced resolution image and a full resolution rectangular image window of a size specified by a user.

17. The network camera of claim 12, further comprising a microprocessor or a CPU.

18. The network camera of claim 17, wherein said microprocessor is configured to control initialization of the pipeline, communicating with a pipeline measurements engine, setting pipeline registers to control dataflow through pipeline multiplexers, and setting pipeline parameters utilized in automatic white balance and automatic exposure and gain control operations.

19. The network camera of claim 18, wherein said microprocessor is further configured to perform processing of statistics accumulated by said measurement engines of the image processing pipeline, calculations of exposure time and gain settings, and calculation of auto white balance parameters.

20. The network camera of claim 17, wherein said microprocessor is further configured to support network communication with external to the camera clients and to communicate with a camera MAC hardware to interpret incoming network packets and to form network packet headers, wherein said microprocessor uses an output logic of the image processing pipeline for computation of partial packet checksums and for loading of the image data in data fields of outgoing network packets.

21. The network camera of claim 12, wherein said image processing pipeline comprises stages configured to perform color interpolation, image sharpening, color separation, gamma correction and color space conversion, wherein said color interpolation comprises converting one-color-per-pixel image into three-colors-per-pixel image, wherein said color interpolation comprises performing multiplication of red, green and blue pixel components by a 3x3 color correction matrix, wherein said image sharpening comprises applying a 2-dimensional high-pass filter to the image, and wherein said color space conversion comprises converting color components of the image to a YUV, YCrCb color-difference representation suitable as an input to the image compression stage of said image processing pipeline.

22. The network camera of claim 17, wherein said image processing pipeline further comprises measurement engines configured to accumulate image brightness and color statistics, wherein said measurement engines include means for communicating said statistics to said microprocessor.

23. The network camera of claim 22, wherein said image processing pipeline further comprises stages configured to perform 2-dimensional pixel defect correction, compensation for image distortions introduced by optics, color saturation control and histogram equalization of the image.

24. The network camera of claim 23, wherein said 2-dimensional pixel defect correction is performed by substitution of a defective pixel with one of non-defective pixels immediately surrounding said defective pixel.

25. The network camera of claim 24, wherein, for all image pixels, a luminance value of a pixel currently being processed as a current pixel is compared to luminance values of 8 pixels of the same color immediately surrounding said current pixel, wherein said substitution of the defective pixel is performed if the current pixel has a luminance value either above or below the luminance values of all said 8 surrounding pixels, wherein said substitution is performed by replacement of all color components of said current pixel with corresponding color components of the replacement pixel, wherein said replacement pixel is one of the surrounding 8 pixels, and wherein said replacement pixel has a luminance value least different in magnitude from the luminance value of said current pixel.

26. The network camera of claim 17, wherein said image processing pipeline comprises stages configured to perform image compression.

27. The network camera of claim 26, wherein said image compression is baseline JPEG compression and wherein said image processing pipeline comprises stages configured to perform formation of minimally coded units, forward discrete cosine transform, zigzag scan, and quantization and entropy.

28. The network camera of claim 26, wherein said image compression is a JPEG2000 or a MPEG-2 compression.

* * * * *

UNITED STATES PATENT AND TRADEMARK OFFICE
CERTIFICATE OF CORRECTION

PATENT NO. : 7,548,258 B2
APPLICATION NO. : 10/994747
DATED : June 16, 2009
INVENTOR(S) : Michael Kaplinsky It is certified that error appears in the above-identified patent and that said Letters Patent is hereby corrected as shown below:

On the Title Page

(57) Abstract, line 3          After "million", Delete "of"

(57) Abstract, line 5          After "comprises", Insert -- a --

(57) Abstract, line 8          After "comprising", Insert -- a --

(57) Abstract, line 12         After "comprises", Insert -- an --

In the Claims

Column 7, Claim 1, line 58       After "A network", Insert -- camera --

Column 8, Claim 1, line 2        Delete "accent", Insert -- accept --

Column 8, Claim 5, line 44       After "A network", Insert -- camera --

Column 8, Claim 5, line 55       Delete "accent", Insert -- accept --

Column 8, Claim 5, line 60       Delete "said stases", Insert -- said stages --

CERTIFICATE OF CORRECTION (continued)
U.S. Pat. No. 7,548,258 B2

Column 9, Claim 8, line 13        After "pixel"
                                  Insert -- , --

Signed and Sealed this

Thirtieth Day of March, 2010

David J. Kappos
*Director of the United States Patent and Trademark Office*